United States Patent

[11] 3,605,112

[72] Inventors Oskar Zumkeller
Villingen;
Karl-Christian Christiansen,
Moenchweiler, both of, Germany
[21] Appl. No. 31,656
[22] Filed Apr. 24, 1970
[45] Patented Sept. 14, 1971
[73] Assignee Kienzle Apparate G.m.b.H.
Villingen, Black Forest, Germany
[32] Priority Apr. 26, 1969
[33] Germany
[31] P 19 21 339.9

[54] APPARATUS FOR RECORDING THE NUMBER OF EVENTS AT A MACHINE
10 Claims, 3 Drawing Figs.

[52] U.S. Cl. .......... 346/67, 346/121
[51] Int. Cl. .......... G07c 3/12
[50] Field of Search .......... 346/62, 123, 121, 23, 67

[56] References Cited
UNITED STATES PATENTS
3,192,532 6/1965 Bruchschmidt .......... 346/23
3,193,834 7/1965 Frank .......... 346/62

*Primary Examiner*—Joseph W. Hartary
*Attorney*—Michael S. Striker

ABSTRACT: Two series of radial lines are recorded in adjacent circular tracks of a rotating record carrier for representing workpieces produced by a machine. Since the recorded lines are spaced in each track twice as far as if only one track were provided, automatic evaluation of the recorded number of lines is facilitated. The apparatus has a multivibrator and two AND gates for routing alternate pulses representing workpieces to different contact means of a rotary switch by which the positions of the recording means on different tracks are determined.

INVENTORS
Oskar Zumkeller
Karl-Christian Christiansen

By: Michael S. Striker
Attorney

INVENTORS
Oskar Zumkeller
Karl-Christian Christiansen
By: Michael S. Striker
Attorney

APPARATUS FOR RECORDING THE NUMBER OF EVENTS AT A MACHINE

BACKGROUND OF THE INVENTION

The present invention relates to apparatus of the type in which events of a machine, such as operational cycles, or workpieces produced by the machine, are recorded in the form of lines along a track of a movable record carrier. In accordance with the prior art for each produced workpiece, or for each specific operational cycle, a line is recorded on a track, and the recording consisting of a series of lines is either visually or automatically counted and evaluated. Such a recording cannot only be easily evaluated by counting, but also provides an easily interpreted representation of the operations of the machine.

This type of recording requires sufficient spacing between the recorded lines at such a density that the lines can still be resolved. It has been proposed to increase the speed of the record carrier in order to obtain wider spacing of the recorded lines. However, it is necessary to change the record carrier more often, if it is rotated at a higher speed. It is very advantageous to have the record carrier rotate one revolution per day, or per 12 hours, or for a working shift, and if the speed of the record carrier is increased this advantage would be lost, and it would be necessary to evaluate a number of different record carriers each of which has moved at a different speed.

The German Pat. No. 1,159,653 discloses an apparatus in which every 10th or every 100th line is made longer, so that each counted decimal-marking line represents 10 or 100 workpieces. However, at high frequencies, even the smaller number of longer lines is difficult to read out, and different sets of decimal-marking lines would have to have different lengths. In any event, at high frequencies, the recorded lines representing single pieces can no longer be distinguished, and even the longer decimal-marking lines cannot be resolved.

It has also been proposed to record the pulses representing workpieces, or decimal multiples of the same, as lines of equal length spaced a distance which even at the highest frequency can still be resolved. For each different decimal factor which is used, a special marking is made to indicate the decimal factor, for example 10 or 100 so that it can be understood that each recorded line represents 10 or 100 workpieces.

This arrangement has the disadvantage that the counting errors may become relatively high particularly under the circumstances in which the frequency is just so high that the next decimal factor has to be used and only every 10th, 100th, or 1000th piece is recorded as a line. It is apparent that, if only every 1000th piece is counted, the corresponding error of 1000 workpieces may occur.

It is one object of the invention to overcome the disadvantages of the prior art, and to provide an apparatus which records operational cycles, or workpieces produced by a machine, or like events, by line recordings which are spaced so that they can be clearly distinguished, but nevertheless record a greater number of events than the arrangements of the prior art.

Another object of the present invention is to record operational events of a machine in two tracks in which alternate events are alternately recorded so that the recording density is doubled while a desired resolution is maintained.

SUMMARY OF THE INVENTION

In accordance with the invention, the recording of events of a machine takes place in at least two, preferably adjacent tracks of a record carrier, and the pulses representing the events of the machine, for example the production of workpieces, are controlled by a routing means in such a manner that alternate pulses are alternately recorded in two adjacent tracks.

The present invention is particularly advantageously applied in recording apparatus whose recording means moves transversely to the movement of the record carrier, and reciprocates within a given recording range. The recording means, which reciprocates with a slide driven by a cam to reciprocate with the recording means, is only moved to a recording position engaging the record carrier, if a contact segment of a rotary switch, which rotates in synchronism with the preferably heart-shaped cam, is connected to the voltage. Such an apparatus can be used for recording working times, piece numbers, and time periods in which the work is interrupted for particular reasons, in parallel or concentric tracks. The recording of the piece numbers in one or two additional tracks requires only the placing of the recording means on the respective tracks, but no constructive changes of the recording apparatus.

An apparatus according to one embodiment of the invention comprises a recording device operated by drive means to reciprocate over a record carrier in a direction transverse to the movement of the record carrier, and including recording means movable toward and away from the record carrier between a retracted position and a recording position; control means, preferably a rotary control switch having contacts, connected with the recording device for permitting movement of the recording means to the recording position only when located over tracks of the record carrier; pulse-generator means for generating pulses representing the number to be recorded on the record carrier; and circuit means connecting the pulse-generator means with the control means. In accordance with the invention, the circuit means include routing means for transmitting alternate pulses of the pulse generator means, alternately to the control means for causing movement of said recording means between said retracted and recording positions so that lines representing alternate pulses are alternately recorded in two tracks of the record carrier.

The routing means preferably include a multivibrator receiving the pulses from the pulse generator, and two AND gates respectively connecting the output of the multivibrator with the two contact means of the rotary control switch which has a plurality of contact means associated with different tracks of the record carrier and is connected with the recording device.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The apparatus disclosed in the present application, is a specific improvement of the apparatus disclosed in the copending U.S. Pat. application Ser. No. 863,079, filed Oct. 2, 1969 by Zumkeller et al., and being assigned to the same assignee as the present application.

Figure 1:
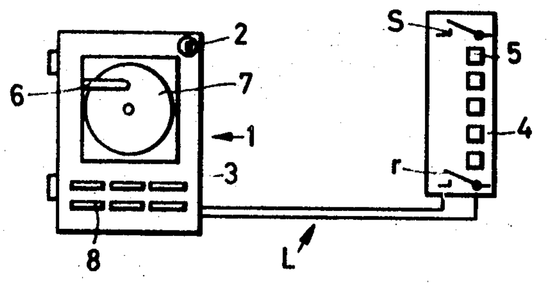
FIG. 1 is a schematic view illustrating an apparatus for recording operational times and number of workpieces of a machine.

Referring now to FIG. 1, a recording apparatus 1, which has a cover locked by a lock 2 in front, is connected by a line L with a device 4 having a plurality of pushbuttons or keys 5 for closing switches, not shown, which effect that a recording means 6 records in a particular track of the record carrier disc 7 which can be viewed through a window in cover 3. Lines are recorded which together form a circumferentially extending stripe or beam, if the recording of working times is involved.

Each pushbutton 5 is associated with a different reason why the working operations of the machine had to be interrupted. Cover 3 has additional windows 8 from which counters for the working time and for the number of produced workpieces, as well as times during which the machine was stopped, can be observed. A switch R is shown to schematically indicate by its position whether the machine operates or is at a standstill. Another switch S schematically indicates a pulse generator whose pulses respectively represent the number of produced workpieces.

Figure 2:
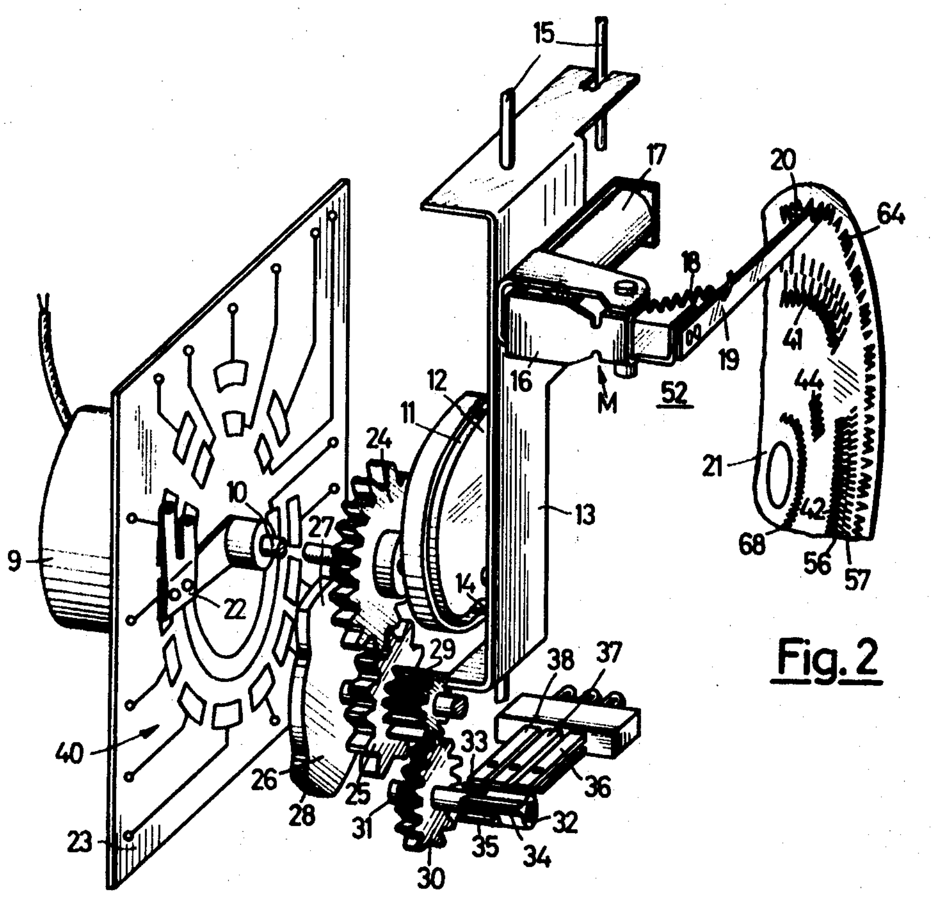
FIG. 2 is a fragmentary perspective view illustrating an apparatus according to one embodiment of the invention.

As shown in FIG. 2, a motor 9 drives through a reduction transmission, a shaft 10 to which a cam 12 having a heart-shaped endless cam groove 11 is secured for rotation. Cam track 11 is engaged by a cam follower 14 which projects from a slide 13 mounted on a pair of rails 15 for reciprocating movement under the control of cam track 11. Recording means are mounted on slide 13, and include a recording arm 19 which has a recording point 20 at the free end thereof, and is secured to the pivotally mounted armature 16 of an electromagnet 17 whose winding is supported on slide 13. A spring 18 acts on recording arm 19 to urge the same to a position in which recording point 20 engages the surface of a record carrier disc 21 which rotates about a central axis, driven by a clockwork, not shown, in the usual manner. Spring 18 holds the recording means 18, 20 in the recording position abutting record carrier 29, but when electromagnetic means 17 is energized, armature 16 is retracted, and recording means 19, 20 moves to an inoperative position in which recording point 20 is spaced from the record carrier. Since slide 13 with the electromagnetic means M and the recording means 19, 20 reciprocates in such a manner that the recording point moves between the outermost position located on a track 64 and an innermost position located on a track 68, the recording means 19, 20 is in the recording position whenever recording pin 20 is located on a track, and is in the inoperative position when recording pin moves in radial direction between two tracks. The control of the electromagnet M for this purpose is effected by the circuit shown in FIG. 3, and described in greater detail in the copending application Ser. No. 863,079. The present invention is concerned with a recording on two adjacent circular tracks 56 and 27, and the recordings are made in the form of two series of circumferential spaced short lines, the lines in adjacent tracks being staggered to each other, and each line representing a workpiece, or a decimal multiple of produced workpieces.

Since the number of lines on each track 56, 57 are to be counted, either by a person or by an apparatus, a certain minimum spacing of the recorded lines is necessary. The other tracks on record carrier 21, for example tracks 41 and 44, are made of radial lines which are so closely spaced that they cannot be distinguished and form a beam or stripe extending along a circumferential arc. These recordings do not represent a number, but a time period corresponding to a partial rotation of record carrier 21.

Shaft 10 carries the slide arm 22 of a rotary switch 23, and also a gear 24 which drives through another gear 25, the cam 26 which has two lobes 27 and 28 which successively act on a switch, not shown, which generates timing pulses for a time counter which can be inspected through one of the windows 8 shown in FIG. 1. Another gear 29 connected with gear 25 for rotation, meshes with a gear 30 on whose shaft 31, a cam 32 is secured which has lugs 33, 34 and 35 controlling switches 36, 37 and 38, also shown in FIG. 3, and whose function is disclosed in detail in the copending application Ser. No. 863,079 with reference to FIG. 4 of the same.

When the mechanism operates, motor 9 rotates shaft 10, cam 12, gear 24, and slide contact arm at a constant rotary speed, so that the slide 13 of the recording device 52 is reciprocated due to the action of the endless cam track 11 on cam follower 14. Assuming that machine switch R is closed, and contact arm 22, see also FIG. 3, engages the contact segment 39 of the contact plate 40, magnet M, and more particularly its winding 17, is deenergized so that spring 18 moves the recording means 19, 20 into engagement with the surface of record carrier 21 whereby a radial line, corresponding to the length of the respective contact segment 39, is recorded on record carrier 21. However, the length of the radial recorded lines can also be determined by timing means to vary within a maximum recording width, as disclosed in the copending application Ser. No. 863,079. The frequency of reciprocation of the recording device and of slide 13, must be selected so that the recordings on tracks 41, 42 and 44 appear to be solid continuous recorded beams or stripes, permitting automatic readout by suitable apparatus.

The recorded circumferential stripes on tracks 41 and 44 respectively represent the working time. If, due to lack of material or other reasons, the productive operation of the machine has to be interrupted, the respective reason for the machine stoppage is indicated by operating one of the keys 5 shown in FIG. 1 so that a contact segment of the contact plate 23, for example contact 43, is connected to a voltage so that the recording device records the recording 44.

While time representing recordings, such as 41 and 44 are desired to be continuous solid black beams or stripes, the recordings on tracks 56 and 57, which represent workpieces, for example, must be spaced, and have such thickness, that they can be clearly distinguished. The pulses generated by impulse generator S, schematically indicated in FIG. 1, have no relation to time. In order to record such pulses, it is necessary to correlate the workpiece representing pulses with the continuously rotating record carrier 21, which means that the transmission of each pulse to the respective contact segment on contact plate 23, must be related to a particular angular position of the rotating contact arm 22 in relation to this contact segment, and consequently to a particular position of the recording device in relation to the track 56 or 57 in which the pulses are to be recorded as radial lines.

Figure 3:
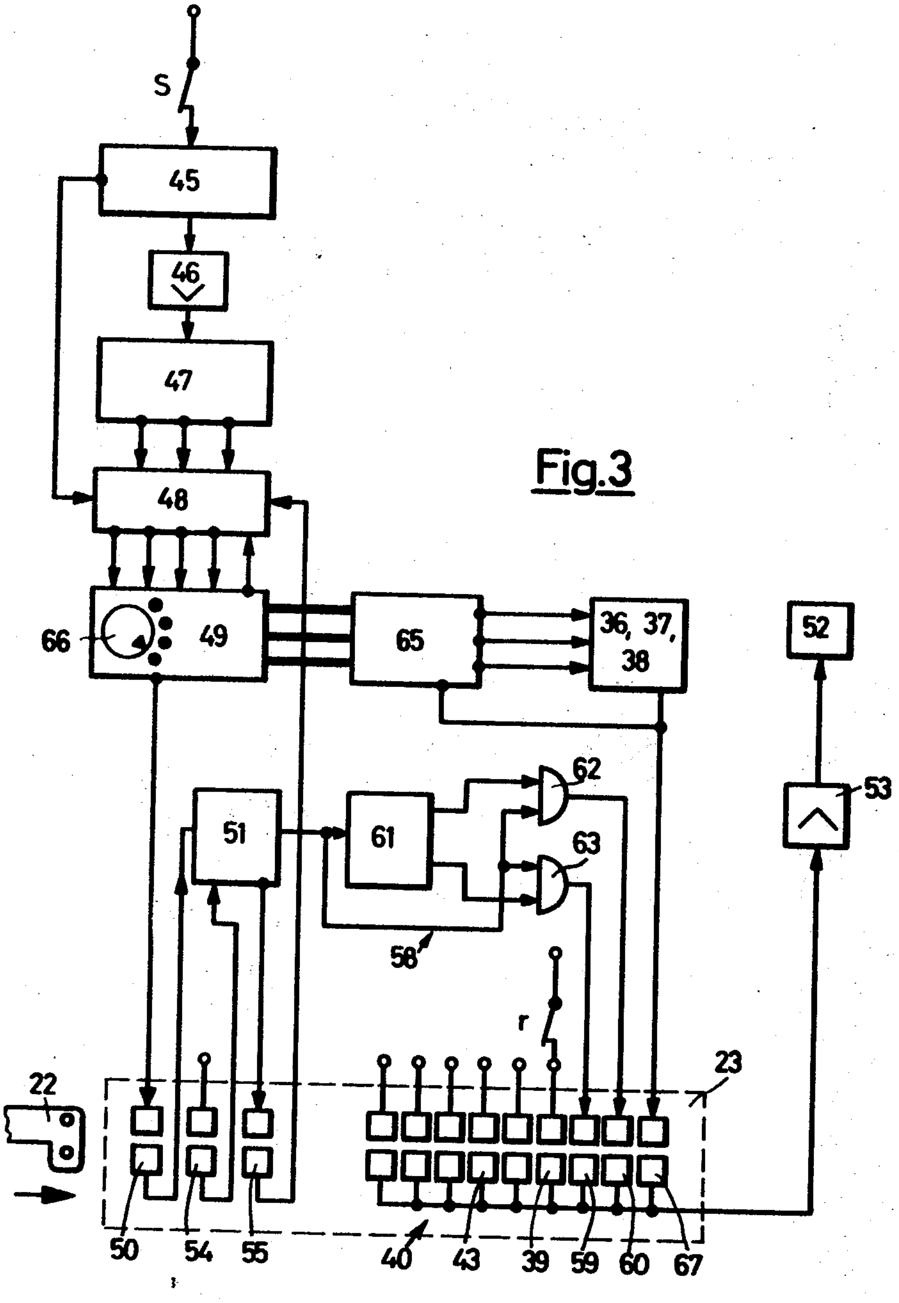
FIG. 3 is a circuit diagram illustrating an electric circuit used in the embodiment of FIG. 2.

This will be best understood with reference to FIG. 3 which shows the impulse generator S connected to an impulse shaper 45 which is connected by an amplifier 46 to a pulse reducing device 47, which may be an adding counter which generates at its output a signal representing every 10th, 100th, and 1000th pulse, and such signals representing a decimal multiple of the actual pulses, are stored in a storage unit 48.

Since drive shaft 10 has a predetermined number of revolutions, for example five revolutions per minute, and since the density of the piece representing recorded lines, depending on the rotary speed of the record carrier 21, has to be selected that a still clearly distinguishable distance between the individual recorded lines remains, a selector device 49 is provided by which the several outputs of storage device 48, which are respectively associated with different decimal orders, can be connected with a switch 50 which is periodically closed by the rotating shaft 10, or by contact arm 22, so that the content of storage device 48 is transmitted by the selector device 49 to the multivibrator 51 and shifts the same. The output of the multivibrator 51 is connected with the contact device 40, and connects the respective contact segment for recording on tracks 56, 57 with a voltage, so that the electromagnet M of the recording device 52 is energized over amplifier 53 when contact arm 22 of rotary switch 23 engages the respective contact segment. Contacts 54 are periodically closed by the rotary contact arm 22, and effect resetting of the multivibrator 51, while contacts 55 effect clearing of an incompletely transferred content of the selected stage of storage device 48, which was selected by turning selector means 66.

As noted above, the minimum distance between radial lines recorded in a circumferential track, is determined by the power of resolution of the optical readout device of the automatic apparatus by which the recordings are read out. Assuming that the record carrier 21 is rotated by a clockwork to make one revolution in 12 hours, the maximum frequency of the workpiece representing pulses is determined, and if this frequency is exceeded, a reduction to the recording of every 10th, or every 100th pulse must be obtained. Assuming that for a record carrier which rotates one revolution in 12 hours, the usable circumferential distance between adjacent line recordings corresponds to rotation of the record carrier during 40 seconds, the maximum frequency is 1.5 pieces per minute. If this frequency occurs, the pulses must be recorded reducing the number 10:1 so that only every 10th piece is recorded in the form of a line, which results in a possibility of an error of plus or minus nine pieces. In accordance with the invention, the pulses are alternately recorded in tow tracks 56 and 57, the pulse frequency is increased to three pieces per minute which means that only after the frequency rises to 3.1 pieces per minute, the selector device 66, 49 must be shifted to the next decimal-reduction factor, for example to record only every 10th pulse.

In order to permit this kind of recording, the multivibrator or flip-flop 51 is followed by a routing means or divider means 58, and two contact segments 59 and 60 are provided for controlling recording magnet M. Contact segments 59 and 60 follow directly the contact segment 39 by which the recording representing working times of the machine are controlled. The routing device 58 includes a multivibrator or flip-flop 61 which prepares the routing of the pulses to be recorded to contact segment 59 or 60, respectively, the multivibrator 61 having two outputs respectively connected with two AND gates 62 and 63 whose outputs are respectively connected with contact segments 59 and 60.

The AND gates 62 or 63 are alternately conductive so that contact segments 59 and 60 are alternately connected to voltage, but depending on the condition of multivibrator 51, namely when multivibrator 51 is set by a pulse received from contact segment 50, either contact segment 59 or contact segment 60 is connected to the voltage.

The invention is not limited to the disclosed embodiment. For example, it is possible to use two separate recording means, and control the same in the manner of the invention. Furthermore, if there is sufficient room on the record carrier, additional recordings can be made in additional tracks so that if more than two tracks are provided for the recordings representing workpieces, the recording errors can be further reduced for the same pulse frequency, while the recorded lines are spaced in each track the same distance. For example, the use of four tracks for the recording lines representing workpieces, could be provided, but an electronic routing means as described above, would become expensive. In such an arrangement a Geneva cross drive, driven by shaft 10 can be used, in which event the shifting from one contact to the other must take place during the downward movement of the recording slide 13.

In the disclosed embodiment, the reciprocation of slide 13 causes movement of the recording point 20 from the outermost position on track 64 to the innermost position on track 68. During this radial movement, deenergization of winding 17 causes engagement of recording point 20 with record carrier 21, and the short radial line whose radial length depends on the time of energization of winding 17, is made in each track. Since in tracks 56 and 57, properly spaced counting pulses are effective, circumferentially spaced lines are recorded in tracks 56 and 57 when rotary contact arm sweeps pairs of contacts 57 and 60, respectively. Due to the rotation of record carrier 21 by an independent clockwork, not shown, the radial lines recorded on tracks 56 and 57 are angularly spaced. Whenever contacts 59 are effective, alternate pulses are supplied to winding 17 from AND gate 63, and whenever contacts 60 are effective, alternate pulses are supplied from AND gate 62 to the winding 17 of the recording device 52, which is only schematically shown in FIG. 3.

For the sake of completeness it should be noted that the track 64 is provided for indicating the decadic value of the lines recorded in tracks 56 and 57, each of which may represent a single workpiece, or 10 workpieces or a 100 workpieces according to selected decimal factors.

For automatic readout apparatus, it is necessary to indicate by a recording, whether a single line of a track has the value 1, or 10, 100, 1000, and in the disclosed embodiment, track 64 has interruptions which are arranged to indicate the decimal factor at which the number of recordings is reduced. For this purpose, the selector device 49 is connected with another selector device 65 which is automatically operated when the manual selector 66 is turned. At the same time when a suitable decimal-reduction ratio is selected, the contact segment 67, which controls the recording in the track 64, is connected in series with one of the cam contacts 36, 37 and 38. When track 64 is to indicate that the actual number of workpieces is counted, it is made continuous. If every 10th workpiece is counted, single interruptions are provided circumferentially spaced along track 64, and two or more interruptions are provided for indicating to the automatic readout device greater decimal-reduction factors. This arrangement is not an object of the invention and disclosed in detail in the copending application Ser. No. 863,079.

It will be understood that each of the elements described above, or two or more together, may also find a useful application in other types of apparatus for recording a number of operational events of a machine differing from the types described above.

While the invention has been illustrated and described as embodied in an apparatus for recording in two adjacent tracks of a record carrier, alternate lines representing the number of workpieces produced by a machine so that the recorded lines in each track are sufficiently spaced for automatic evaluation which is carried out for both tracks simultaneously, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Apparatus for recording the number of operational events of a machine, comprising first drive means for moving a record carrier at a constant speed in one direction; second drive means; a recording device operated by said second drive means to reciprocate over said record carrier in a direction transverse to said one direction, and including recording means movable toward and away from said record carrier between a retracted position and a recording position; control means connected with said recording device for permitting movement of said recording means to said recording position only when located over tracks of said record carrier; pulse-generator means for generating pulses representing the number to be recorded on said record carrier; and circuit means connecting said pulse-generator means with said control means, and including routing means for transmitting alternate pulses of said pulse-generator means alternately to said control means for causing movement of said recording means between said retracted and recording positions so that lines representing alternate pulses are alternately recorded in at least two tracks of said record carrier.

2. Apparatus as claimed in claim 1 wherein said control means include control switch means connected into said circuit means and having a plurality of contact means associated with different tracks of said record carrier and being connected with said recording device, and wherein said routing means transmit alternate pulses of said pulse-generator means alternately to two contact means of said control switch means so that lines representing alternate pulses are alternately recorded in two tracks of said record carrier.

3. Apparatus as claimed in claim 1 wherein said circuit means include electromagnetic means for moving said recording means between said retracted and recording positions; and comprising cam means driven by said second drive means, and a cam follower cooperating with said cam means and connected with said recording device for reciprocating the same.

4. Apparatus as claimed in claim 1 wherein said first drive means rotates said record carrier about an axis at constant speed so that said record carrier performs one revolution in a predetermined time; wherein said recording device is reciprocated so that said recording means moves in radial direction of said record carrier for making said lines in said tracks; and wherein said tracks are circular.

5. Apparatus as claimed in claim 1 wherein said two tracks are adjacent; and wherein said lines in said adjacent tracks are staggered to each other.

6. Apparatus as claimed in claim 2 wherein said routing means includes a multivibrator receiving said pulses, and two AND gates respectively connecting the output of said multivibrator with said two contact means.

7. Apparatus as claimed in claim 6 wherein said first drive means rotates said record carrier at a constant rotary speed; wherein said control switch means includes a contact plate having a plurality of contact means arranged in concentric circles, and a contact arm rotated by said second drive means and sweeping said contact means.

8. Apparatus as claimed in claim 7 wherein said circuit means include electromagnetic means for moving said recording means between said retracted and recording positions; and wherein said contact means are connected with said electromagnetic means.

9. Apparatus as claimed in claim 1 wherein said routing means are electronic routing means.

10. Apparatus as claimed in claim 1 wherein said routing means includes a stepping mechanism driven by said second drive means.